June 8, 1954

W. N. WOODRUFF 2,680,506

PARKING METER

Filed Jan. 25, 1951

INVENTOR.
WILLIAM N. WOODRUFF
BY
Zugelter & Zugelter
Attys.

June 8, 1954
W. N. WOODRUFF
2,680,506
PARKING METER
Filed Jan. 25, 1951
7 Sheets-Sheet 5
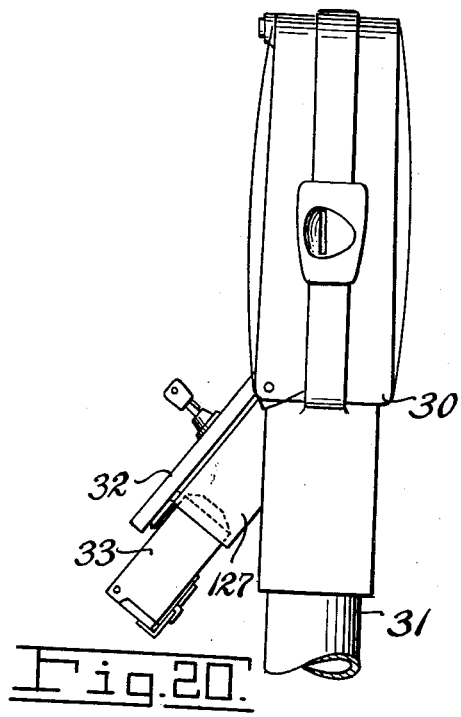
Fig.20.
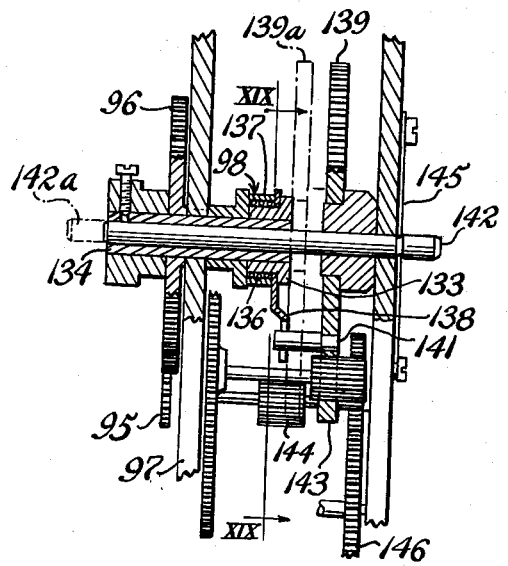
Fig.18.
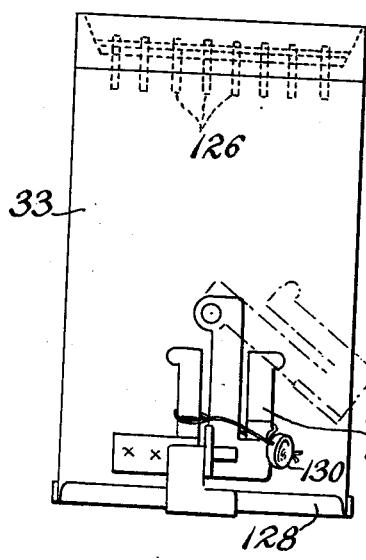
Fig.21.
Fig.19.
INVENTOR.
WILLIAM N. WOODRUFF
BY
Zugelter & Zugelter
Attys.

June 8, 1954 W. N. WOODRUFF 2,680,506
PARKING METER
Filed Jan. 25, 1951 7 Sheets-Sheet 6

INVENTOR.
WILLIAM N. WOODRUFF
BY
Jugelter & Jugelter
Attys.

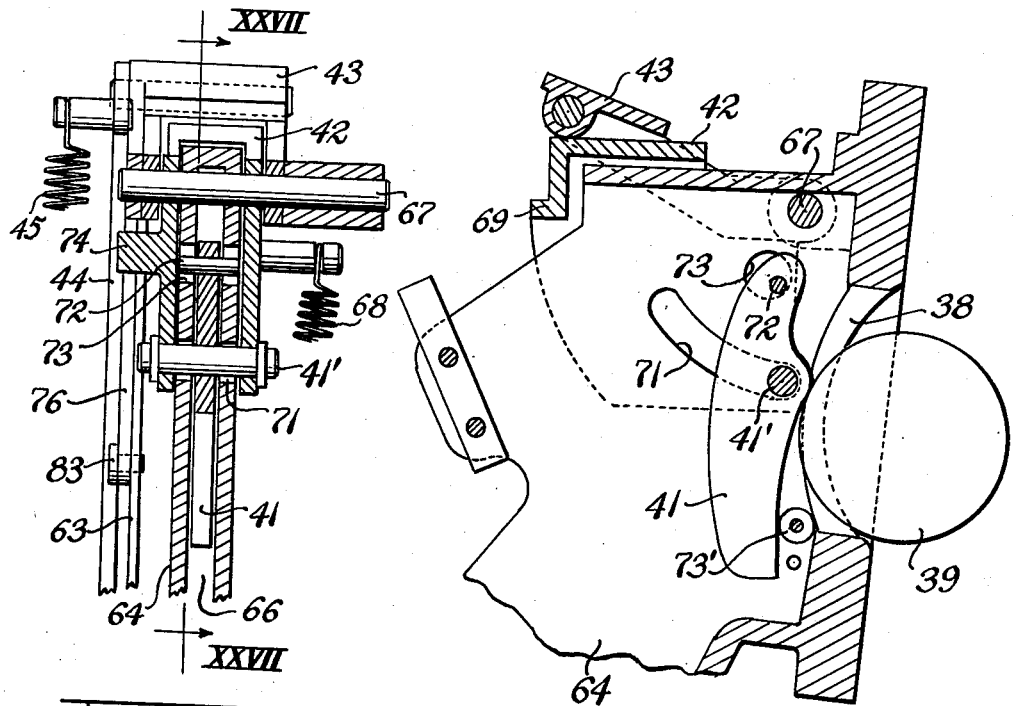

Patented June 8, 1954

2,680,506

UNITED STATES PATENT OFFICE 2,680,506

PARKING METER

William N. Woodruff, Cincinnati, Ohio, assignor to Herschede Hall Clock Company, Cincinnati, Ohio, a corporation of Ohio Application January 25, 1951, Serial No. 207,774

13 Claims. (Cl. 194—54)

This invention relates to a coin operated parking meter.

An object of this invention is to provide a coin operated parking meter in which a plurality of coins having the same or different parking time values, may be deposited one after the other, the meter registering the total parking time that has been paid for by the total parking time value of the respective coins deposited in the meter.

Another object of the invention is to provide a parking meter of the type set forth above that will register overtime parking when the paid parking time has expired.

A further object of the invention is to provide a parking meter in which the "drive" mechanism for the parking time registering mechanism is interlocked with a gate in the meter coin slot, whereby operation of said drive mechanism is precluded until the gate closes the coin slot.

Another object of the invention is to provide a coin operated parking meter having mechanism for registering the paid parking time and a separate clock mechanism for actuating the time registering mechanism in a direction to indicate how much time of the paid parking time remains.

A further object of the invention is to provide a time totalizing mechanism that operates by stored energy resulting from the force applied to the coins as they are forced through the coin slot of the meter, the total time recorded being a function of the diameters of the coins deposited in the meter coin slot.

Another object of the invention is to provide a meter that will totalize the parking time purchased by one or more coins having equal or different parking time value and add to that total unexpired portion of parking time registered on the meter at the time said coin or coins are deposited.

A further object of this invention is to provide a parking meter of this type which uses power from the main spring only for driving a clock and requires no power from the main spring for operating other mechanism thereof.

The above and other objects and features of the invention will in part be apparent and will in part be obvious from the following detailed description and the drawings, in which:

Fig. 2 is a view in side elevation of the parking meter, the casing of the meter being partly broken away and in section to reveal structural details;

Fig. 3 is a view in side elevation of the mechanism of the parking meter with the casing, index hands and dials removed;

Fig. 4 is a view in front elevation of the mechanism illustrated in Fig. 3;

Fig. 5 is a fragmentary view in section taken along a line V—V in Fig. 4, a coin slot carrying member being shown in elevation and partly broken away and in section to reveal details of construction, the mechanism being shown in the position assumed prior to the insertion of a coin;

Fig. 6 is a fragmentary view in section along the line V—V showing the mechanism in the position assumed when a coin has been partly inserted in the coin slot;

Fig. 7 is a fragmentary sectional view along the line V—V showing the mechanism in the position assumed when a coin has been inserted in the coin slot and has fallen to the first coin stop;

Fig. 8 is a fragmentary view in side elevation showing the same side of the mechanism as illustrated in Fig. 3, the mechanism being shown in the position assumed when a coin has been partly inserted in the coin slot, index hands and dials being removed;

Fig. 9 is a fragmentary view in side elevation of the mechanism showing the position assumed when the coin inserted in the coin slot is a penny and the penny has fallen to the first coin stop;

Fig. 10 is a fragmentary view in side elevation of the mechanism showing the position assumed when the coin inserted in the mechanism is a nickel and the nickel has fallen to the first coin stop;

Fig. 11 is a fragmentary detailed view of the mechanism of the first coin stop showing a coin resting thereon;

Fig. 12 is an enlarged view in section along a line XII—XII in Fig. 8;

Fig. 13 is an enlarged view in section along a line XIII—XIII in Fig. 11;

Figure 14:
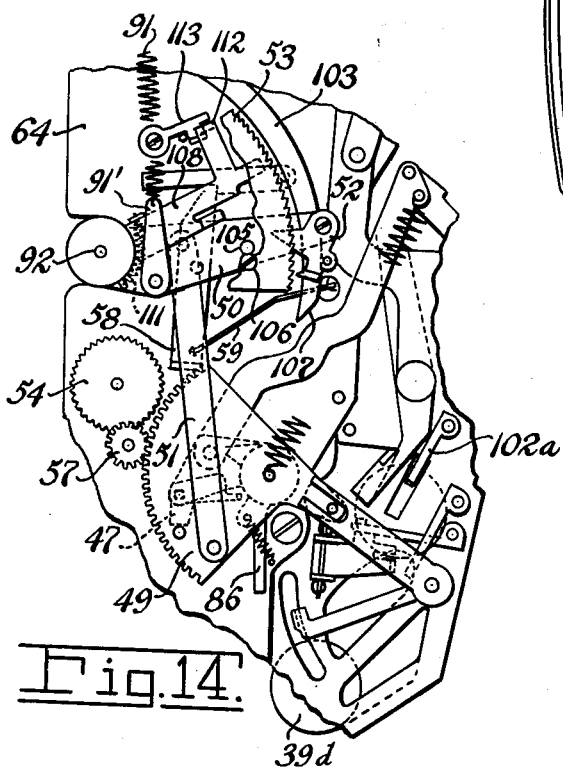

Fig. 14 is a fragmentary view in side elevation showing the mechanism in the position assumed when the coin has dropped to the first coin stop and the mechanism has advanced through a portion of its stroke, the mechanism being in the position assumed when a penny is inserted in the coin slot and overtime is registered by the meter, the index hands and dials being removed and part of the framework being broken away and in section for clarity of detail;

3

Figure 15:
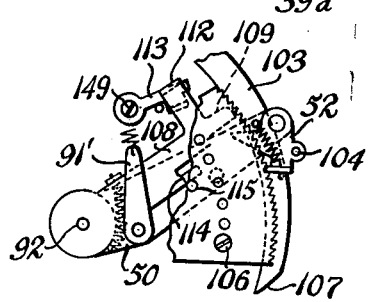
Figure 16:
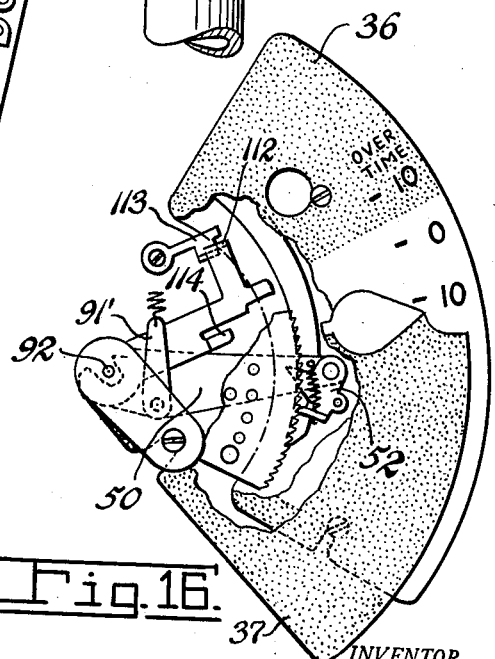
Figure 17:
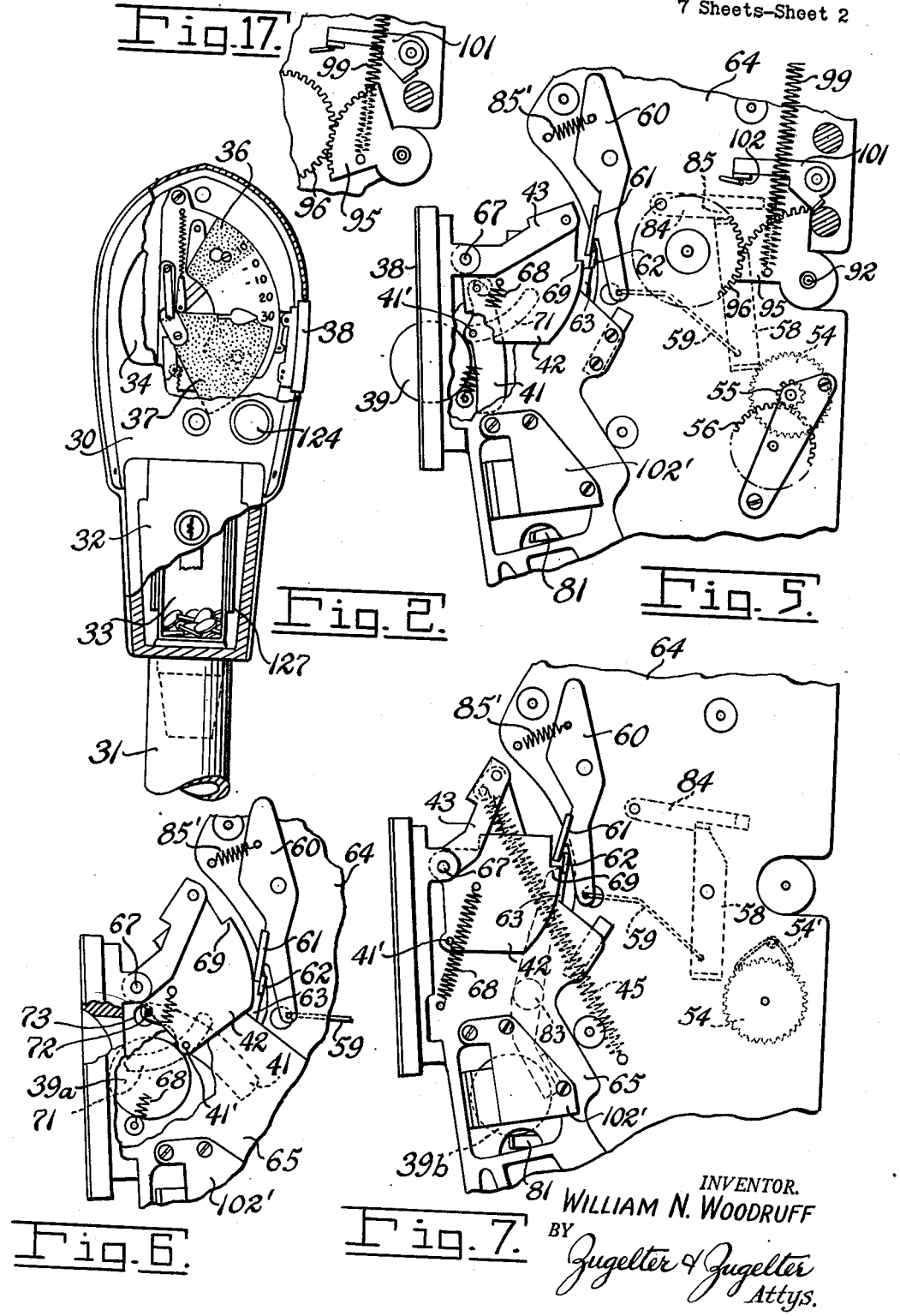
Figure 18:
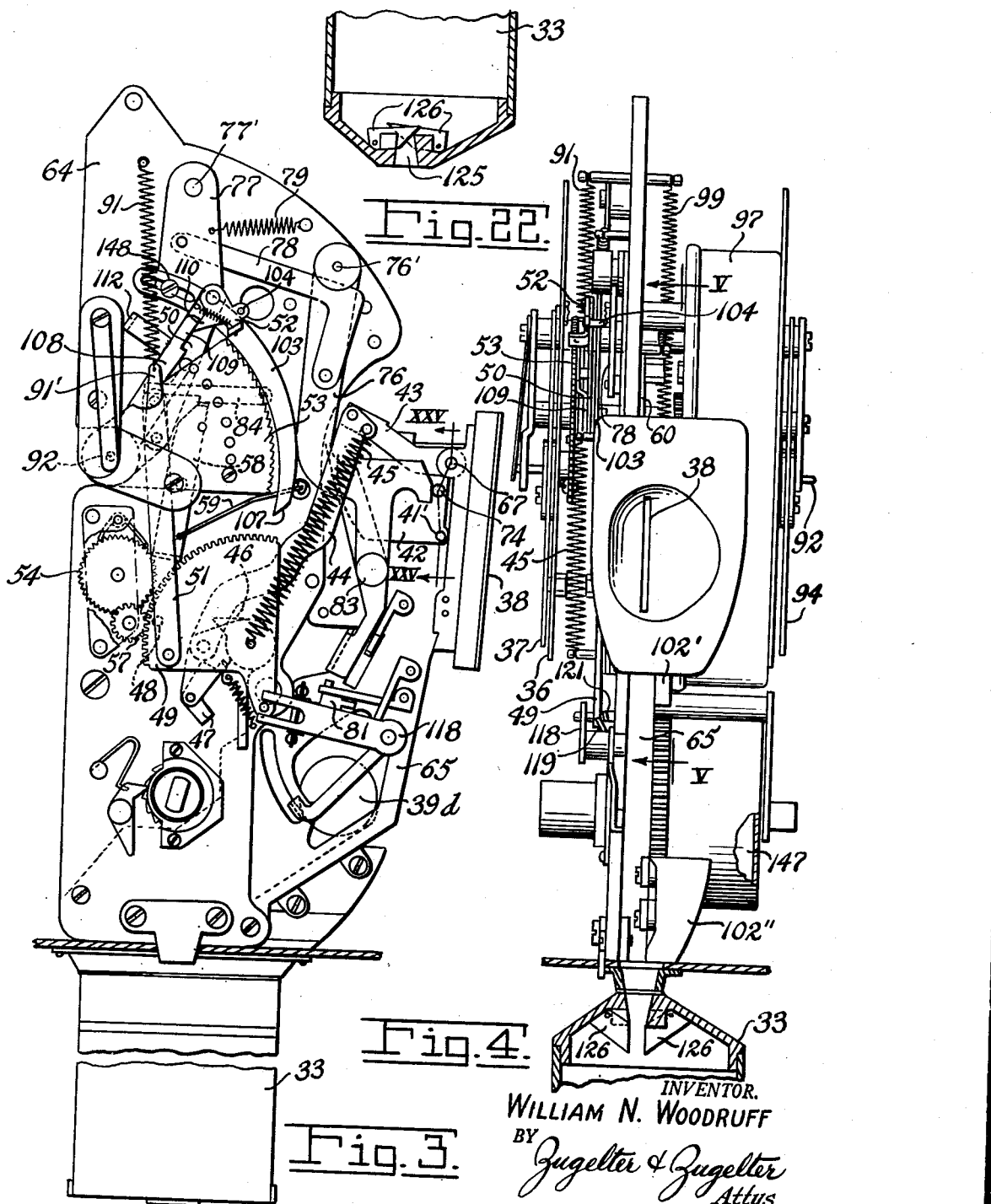
Figure 19:
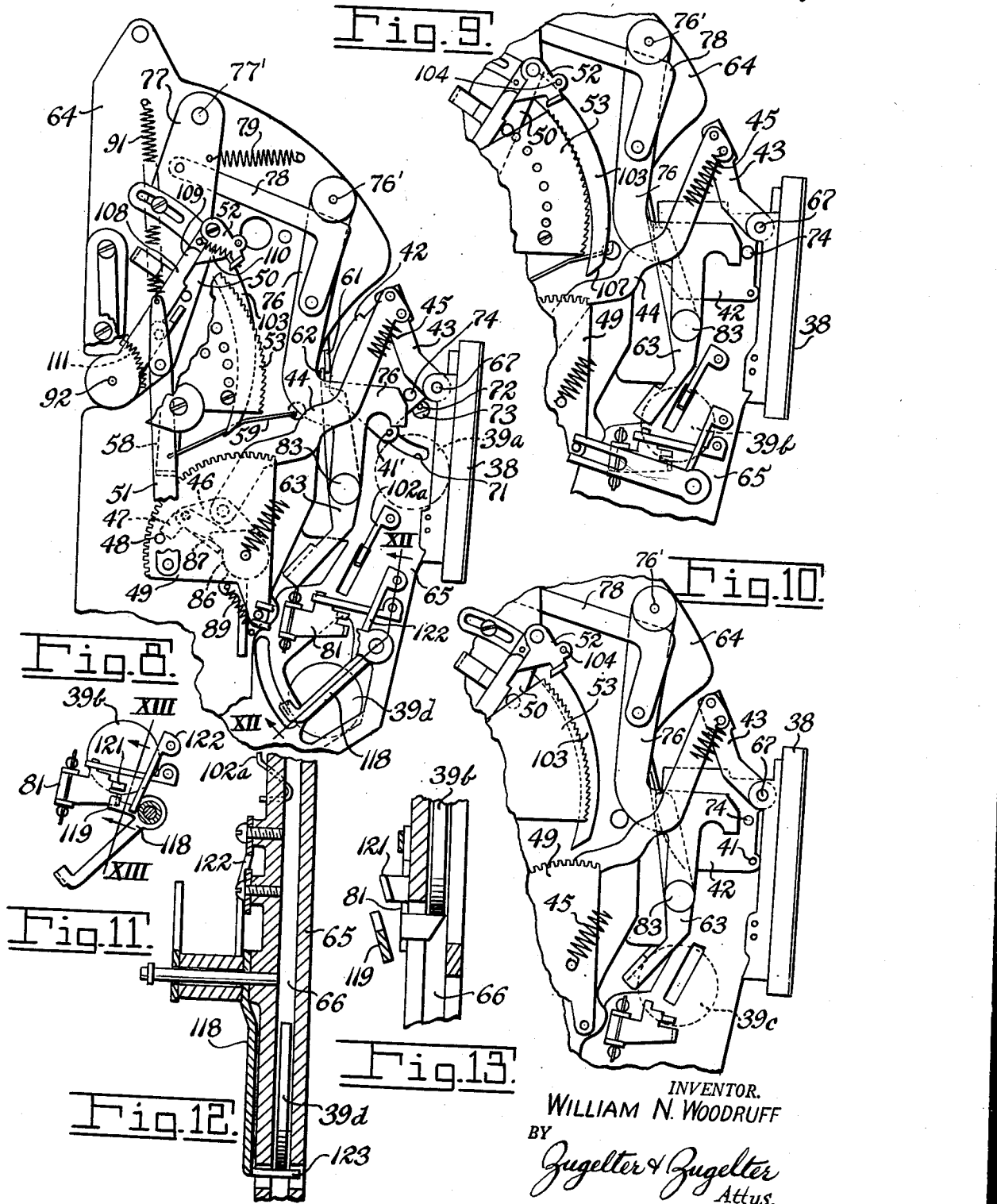
Figure 25:
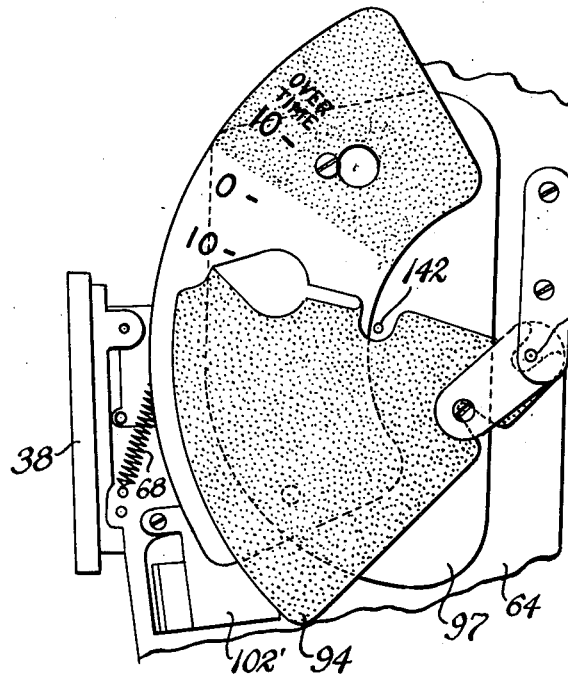
Figure 23:
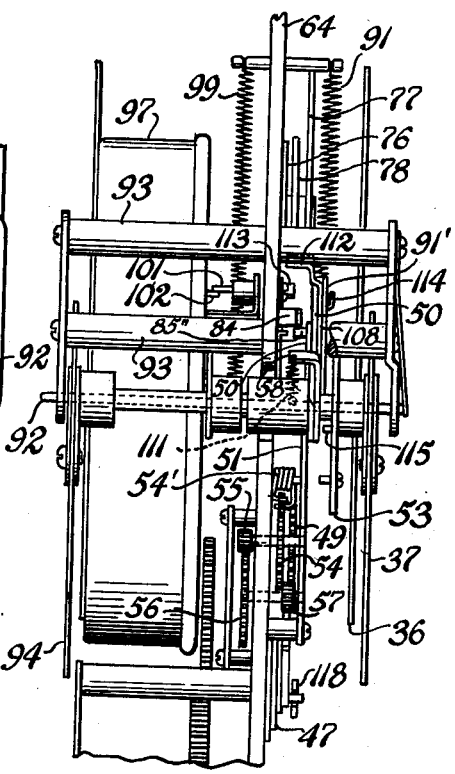
Figure 24:
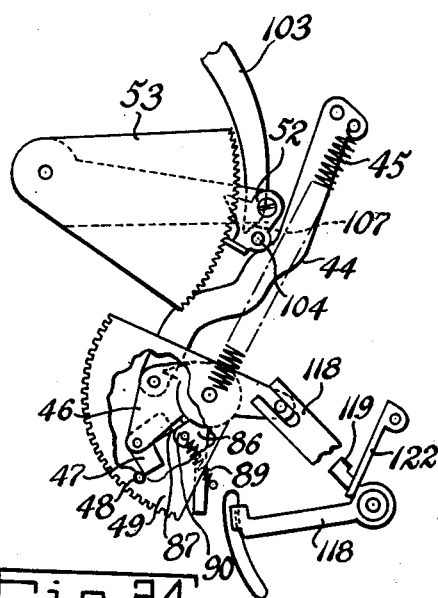

Fig. 15 is a fragmentary view in side elevation, partly in section, of the mechanism showing the ratchet and pawl in the position assumed when the coin inserted in the coin slot is a nickel and overtime is registered;

Fig. 16 is a fragmentary view in side elevation of the mechanism with one index hand and dial attached, the mechanism being shown in the position assumed when a nickel is inserted in the coin slot but no overtime is registered, part of the dial and index hand being broken away for clarity;

Fig. 17 is a fragmentary view in section along the line V—V showing clock stopping mechanism in clock released position;

Fig. 18 is a sectional view of a clutch mechanism and of the driving connections between the clockwork and the other mechanism of the meter, the section being taken along the shaft on which the clutch is mounted;

Fig. 19 is a sectional view taken along a line XIX—XIX in Fig. 18;

Fig. 20 is a view in front elevation of the parking meter with the casing in place and with the door of the meter open and the coin box thereof partly inserted;

Fig. 21 is a view in side elevation of the coin box;

Fig. 22 is a sectional view of the slotted end of the coin box with coin stops in position to close the coin slot;

Fig. 23 is a fragmentary view in rear elevation of the mechanism of the parking meter;

Fig. 24 is a fragmentary view in side elevation of the mechanism of the parking meter, parts of the mechanism being broken away and removed for clarity of detail, the mechanism being shown in the position assumed when a penny is inserted and no overtime is registered;

Fig. 25 is a view in side elevation of the parking meter showing the other side thereof, the casing being removed to show interior details;

Fig. 26 is an enlarged view in section taken along a line XXVI—XXVI in Fig. 3; and Fig. 27 is an enlarged view in section taken along a line XXVII—XXVII in Fig. 26.

In the following detailed description, and the drawings, like reference characters indicate like parts.

Figure 1:
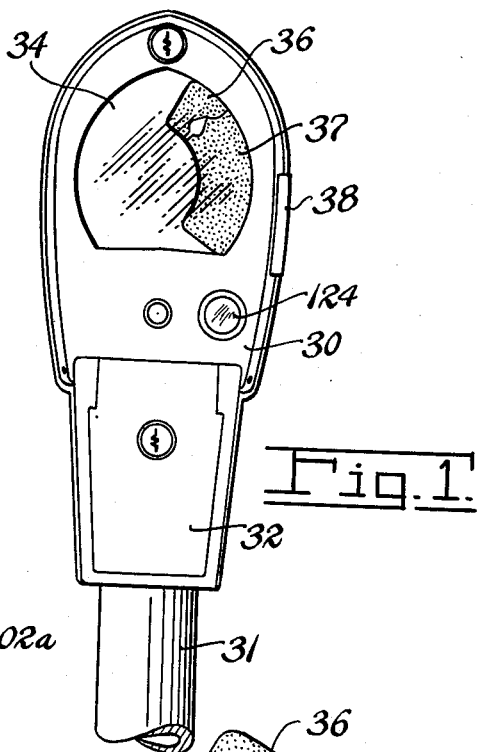
Figure 1 is a view in side elevation of a parking meter constructed in accordance with an embodiment of this invention.

As shown in Figs. 1, 2, and 20, the parking meter includes a casing 30 mounted on a post 31. The lower portion of the casing is provided with a door 32 which can be opened for removal of a coin box 33 (Fig. 20). The upper portion of the casing includes a window 34 (Fig. 1) of strong, tough transparent material through which a dial 36 and index hand 37 can be observed (see Figs. 1 and 16). When a coin is inserted in a coin slot 38, index hand 37 is moved across the dial to a position such as that shown in Fig. 2. The distance that the index hand is advanced is determined by the size of the coin inserted and the setting of the mechanism.

Coin slot 38 is provided with a gate 41 mounted to swing inwardly and upwardly in the slot. When a coin 39 is inserted in coin slot 38 (see Fig. 27) the coin engages gate 41 and swings it to the position shown in Fig. 6. The gate is pivotally supported by a pin 41' on a saddle bell crank 42. As the coin is inserted in the slot, saddle bell crank 42 is swung upwardly to the Fig. 6 position. As crank 42 swings, it engages and raises a second saddle bell crank 43. Crank 43 is connected to a power link 44 and a drive spring 45 (Figs. 3 and 8). As the coin is in-

4 serted in the coin slot and crank 43 is raised, the drive spring is stressed and power link 44 is raised from the position shown in Fig. 3 to that shown in Fig. 8. As the power link is raised, it swings a drive pawl arm 46 (Figs. 3, 8, and 24) upwardly until a pawl 47 carried thereby engages a pin 48 on a gear segment 49. Segment 49 is connected to a second pawl arm 50 by a link 51 (Figs. 3 and 8) so that when the segment is swung counterclockwise, pawl arm 50 is swung clockwise. A pawl 52 carried by pawl arm 50 is engageable with a ratchet 53 for driving the ratchet in clockwise direction. The ratchet in turn is connected to and swings with the index hand 37 (see Fig. 16). When pawl arm 50 is swung clockwise, pawl 52 advances the ratchet and index hand in a clockwise direction.

Segment 49 and pawl arm 50 are restrained by an escapement or governor wheel 54, a governor spring 54', and a train of gears 55, 56, and 57 (see Fig. 23). Governor wheel 54 normally is locked by a locking lever 58 (Fig. 5), but locking lever 58 can be swung away and released from the governor wheel by a link 59. Link 59 is connected to a gate locking lever 60. Lever 60 includes a lock plate 61 engageable by a lug 62 at the head of a trigger member 63 (Figs. 8, 9, and 10). When coin 39 is inserted in coin slot 38 and falls to the position shown at 39b in Fig. 9, the coin engages the lower end of trigger 63. The trigger swings the gate locking lever 60 to the position shown in Fig. 7 and thereby releases the governor wheel so that pawl arm 50 and its pawl 52 can be swung in a clockwise direction, as shown in Fig. 3, to engage and advance ratchet 53 and index hand 37 a predetermined distance to expose a predetermined portion of the face of the index plate. Thereafter, the index hand is returned under the control of clockwork to the position shown in Fig. 1.

The device described in general terms above is described in greater detail below.

The main framework of the parking meter includes a main plate 64 and a hollow coin slot carrying member 65 which are firmly fastened together. Coin slot 38 is in member 65. Member 65 also contains a coin passageway 66 (Fig. 12). Passageway 66 is below and communicates with coin slot 38. Coins passing through slot 38 are guided into passageway 66. Details of passageway 66 and of coin stops which arrest coins therein will be described more fully hereinafter.

Crank 42 (Figs. 26 and 27) is hinged to member 65 by a pin 67 that extends across the upper end of passageway 66. The crank 42 is normally held in closed position by a spring 68 (Figs. 5 to 7). When crank 42 is raised, a shoulder 69 on the crank is engageable with the lock plate 61 (Figs. 5 and 7) of gate locking lever 60 to lock the lever 60 and prevent release of the governor wheel so long as the gate crank 42 is in the raised position as shown in Fig. 6. Further, lock plate 61 engages the shoulder of crank 42 to lock the gate in closed position when the governor wheel is released to prevent insertion of a coin so long as the governor wheel is turning.

Gate 41 is pivotally supported on the crank at approximately its center (see Figs. 26 and 27). The pivot is formed by pin 41'. Pin 41' extends through slots 71 in the sides of members 64 and 65. The upper end of the gate is guided by a pin 72 which extends through the gate and into small circular openings 73 in the sides of members 64 and 65. Pin 72 restrains the upper end of the gate and causes the gate to swing well back and up and away from the coin slot when a coin is inserted in the coin slot, as shown most clearly in Fig. 6. When the coin is inserted in coin slot 38, the coin engages the gate and a roll 73' at the lower end of coin slot 38. When the coin passes the position shown at 39a in Fig. 6, gate 41 is closed and crank 42 is lowered by spring 68 and the force with which the gate is closed forces the coin to the position indicated at 39b in Figs. 7 and 9.

Crank 42 includes a lug 74 (Figs. 3, 9, and 10) which engages a trigger carrying lever 76 and swings the lever back, as shown in Fig. 8 when the gate is opened. Lever 77 swings on a pivot 76'. Lever 76 in turn pivotally supports the trigger 63 so that the trigger is swung back as a coin is inserted in the coin slot.

Trigger carrying lever 76 is linked to a track carrying lever 77 by an L-shaped link 78, and the trigger carrying lever 76 and track carrying lever 77 swing back and forth together. Lever 77 swings on a pivot 77'. A spring 79 urges levers 76 and 77 toward the coin slot and normally holds lever 76 in engagement with lug 74, as shown in Fig. 3.

When a coin is inserted in the coin slot, lever 76 and its trigger 63 are pushed back to the position shown in Fig. 8. Then, when the coin has passed gate 41 it falls to a first coin stop 81, and lever 76 and its trigger 63 are returned by spring 79 to bring the lower end of trigger 63 against the coin (see Figs. 9 and 10). As the lower end of the trigger engages the coin, the trigger turns on its pivot 83 causing the head 62 of the trigger to engage lock plate 61 (Fig. 7). When lock plate 61 is engaged by the trigger, locking lever 60 turns on its pivot whereby the lower end of lever 58 is drawn away from and releases governor wheel 54. A weighted lever 84 having a shoulder 85 (Fig. 5) engages the head of lever 58 (as shown in Fig. 7) to hold the lever out of engagement with governor wheel 54 during the down and return strokes of the pawl arm 50. When the down and return strokes are completed, levers 60 and 58 are returned by a spring 85' to the position at which the governor wheel is locked, and a lug 85'' (Fig. 23) on pawl arm 50 engages and raises lever 84 to release the governor locking lever 58 to governor locked position.

As already pointed out, when crank 42 is swung up and back by a coin in the coin slot, it engages and raises crank 43 whereby drive spring 45 is stressed, drive pawl arm 46 is cocked and pawl 47 is driven to the position shown in Fig. 8. Drive pawl 47 is an L-shaped member pivotally secured to pawl arm 46 and free to move thereon. As pawl arm 46 is cocked, the pawl is engaged by a pawl setting member 86 which engages one arm 87 of pawl 47 and swings the pawl clockwise, as shown in Fig. 8, into engagement with pin 48 of gear segment 49. The member 86 is pivotally mounted on the axis of gear segment 49 and is held by a spring 89 in position to engage and cock pawl 47 when pawl arm 46 is swung a sufficient distance, as shown in Fig. 8.

When the governor wheel is released, gear segment 49 swings to the position shown in Fig. 24 where arm 87 of drive pawl 46 engages a lug 90 on pawl setting member 86 and disengages the drive pawl from pin 48 thereby releasing the gear segment, as shown in Fig. 24.

As segment 49 turns counterclockwise, as shown in Figs. 3 and 8, a spring 91, connected to pawl arm 50 by a short link 91', is stressed, so that, when the drive pawl is released, spring 91 returns gear segment 49 and pawl arm 50 to their normal position, as shown in Fig. 3.

Pawl arm 50 is pivotally mounted on a shaft 92 which extends across the rear of the mechanism (Fig. 23). Shaft 92 in turn is pivotally mounted on a framework 93 attached to plate 64. Shaft 92 is secured to and turns with ratchet 53, index hand 37 and a second index hand 94 (Fig. 25). Index hand 94 is on the opposite side of the mechanism from index hand 37. Index hand 94 is visible through windows in the casing (not shown) which may be similar in construction to window 36 (Fig. 1). Shaft 92 (Figs. 5 and 23) also carries a gear segment 95 that meshes with a gear 96 (Figs. 5 and 18). Gear 96 is mounted on the outside of a clockwork casing 97 and is connected to clockwork inside the casing, which will be described in greater detail hereinafter. Casing 97 houses the clockwork of the parking meter. Gear 96 is connected to the rest of the clockwork through a one-way clutch, indicated generally at 98 in Figs. 18 and 19 and to be described in greater detail hereinafter. The clutch permits the index hands and shaft 92 to swing freely in a clockwise direction, as shown in Figs. 2 and 3. A spring 99 (Figs. 5 and 23) urges shaft 92 in the opposite direction but the clutch restrains return thereof so that shaft 92 and the index hands are returned only at the rate permitted by the clockwork. The return motion of shaft 92 and the index arms reaches a limit when gear segment 95 (Fig. 5) engages a clockwork stopping member 101 (Figs. 5 and 23). Member 101 is pivotally mounted on plate 64 and swings or turns counterclockwise, as shown in Fig. 5, when engaged by gear segment 95, until it engages and lowers the end of a clock stop rod 102. Stop rod 102 extends from the clock casing, as shown in Fig. 23. Stop rod 102 may be connected to the escapement of the clockwork in any suitable manner (not shown) so that the clockwork is stopped when the end of rod 102 is lowered to stop position. Index hands 37 and 94 are set to read a predetermined amount of overtime parking when the clockwork is stopped.

The distance which the index hands and ratchet are advanced each time a coin is inserted in the coin slot is determined by the size of the coin, and whether overtime is recorded by the index hands.

The parking meter illustrated is designed to receive pennies and nickels, but it is to be understood that the mechanism may readily be modified to accommodate coins of other denominations. If a coin is inserted which is too small to actuate the mechanism, for example, a dime, the dime is driven out of passageway 66 by a spring 102a (Figs. 8 and 12) into a coin rejecting housing 102' (Figs. 4 and 7) and falls into a coin chute 102'' which directs the dime into the coin box.

If a penny is inserted in the coin slot, the penny falls to the point indicated at 39b in Fig. 9 where the penny engages the lower end of the trigger but the trigger carrier substantially abuts lug 74. If, on the other hand, a nickel is inserted in the coin slot, the nickel comes to rest at the point indicated in Fig. 10 at 39c where the nickel holds the lower end of the trigger in a position that is spaced from its released position, and trigger carrier 76 is spaced from lug 74. Accordingly, when a nickel is inserted, trigger carrier 76, link 78, and track carrying lever 77 come to rest in the Fig. 10 position and further from the coin slot than when a penny is inserted. Track carrying lever 77 supports a track 103 which is positioned to engage a pin 104 that extends transversely of pawl 52 (Fig. 4) to hold pawl 52 off the ratchet for a major portion of the stroke of pawl arm 50 when a penny is inserted in the coin slot. If a nickel is inserted, track 103 is held in the Fig. 10 position in which the track is disengaged from the pin 104 and the pawl can engage the ratchet for a greater portion of its stroke.

In the event that a penny is inserted in the coin slot at a time when the clock is stopped and the index hands show overtime, the index hands and ratchet are advanced the distance representing the amount of time permitted by the penny plus the overtime. The index hands and ratchet are advanced by engagement of a lug 105 on pawl arm 50 and the shank of a screw 106 which extends through the ratchet, as indicated in Fig. 14. If, on the other hand, the clock is not stopped and the index hands show that there is unused parking time remaining, the pawl travels along track 103 to the end 107 thereof at which location the pawl is released to engage and advance the ratchet, as shown in Fig. 24, a predetermined distance called for by a penny.

If a nickel is inserted in the coin slot, track 103 is held back and away from pawl pin 104, as already pointed out. However, the pawl is held out of engagement with the ratchet for a portion of the stroke of the pawl arm by a release lever 108 (see Fig. 8). Lever 108 is pivotally mounted on shaft 92. Lever 108 is normally held in the position shown in Figs. 3 and 8 in which a finger 109 of lever 108 engages an arm 110 of the pawl to hold the pawl elevated above the ratchet. Lever 108 is held in this position by a spring 111. However, when pawl arm 50 is advanced a predetermined distance from its normal position a lug 112 on lever 108 engages a stop 113 and raises lever 108 from pawl arm 50 thereby permitting pawl 52 to engage and advance the ratchet (see Fig. 16) a predetermined distance, as called for by a nickel. If the clock is stopped or the index hands show overtime when a nickel is inserted, a lug 114 on lever 108 engages a pin 115 on the ratchet thereby raising the lever and releasing the pawl to ratchet engaged position. The pawl engages the ratchet a distance sufficiently in advance of the point where stop 113 is engaged by stop lug 112 that the index arms and ratchet are advanced a distance corresponding to the overtime (see Fig. 15). Thereupon, lever 108 is held off pawl arm 110 by stop 113 and the index hands are advanced the amount called for by a nickel.

During the down or operative stroke of pawl arm 50, the coin which has been inserted in coin slot 38 is held in the position shown in Figs. 9, 11, and 13 and the coin rests on coin stop 81. As shown in Fig. 11, coin stop 81 is pivotally mounted and can swing outwardly from passageway 66. As pawl arm 50 and gear segment 49 turn, a three-pronged coin catching member 118 is rotated clockwise to a position shown in Fig. 24. As member 118 rotates, a cam arm 119 thereof moves past a cam arm 121 of coin stop 81. As member 118 swings upwardly, it moves out from coin passageway 66 and to the left, as shown in Fig. 12 to pass cam arm 121 and then is returned to the right by a spring 122 to a position at which cam arm 119 can engage the other side of cam arm 121 to swing coin stop 81 away from passageway 66, whereby the coin is released. When released, the coin falls through passageway 66 and is caught by the lower arm 123 of member 118 and held in the position shown in Fig. 3 at 39d until the next coin is inserted in the coin slot. In that position, the coin is visible through a window 124 in the casing of the parking meter (Fig. 1). When the next coin is inserted, member 118 swings upwardly and the coin is thereby released (see Fig. 3) to coin box 33.

As shown in Fig. 22, coin box 33 has a slot 125 at one end thereof through which coins enter the coin box. Slot 125 is closed by pivotally mounted coin stops 126 when the box is held with the slot down. When the box is held with the slot up, as for insertion in the parking meter casing, the stops fall by gravity to open position so that coins can freely enter the coin box (see Fig. 4). The coin box slides up and down on rails 127 on the inside of door 32 so that when the door is opened, the coin box falls down out of the parking meter casing. Then an empty coin box is slid up the tracks and the door is closed whereby the box is held in position to receive coins from passageway 66. The coin box is provided with a hinged lid 128 (Fig. 21) at the end opposite slot 125. The lid is latched shut by a latch 129 which can be sealed shut with a seal 130.

When the index arms and ratchet have been lowered, as to the position shown in Fig. 16, the index arms and ratchet are urged upwardly by spring 99 (Figs. 4 and 5). However, turning of shaft 92, which carries the index arms and ratchet, is restrained by clutch 98 (Figs. 18 and 19). Clutch 98 includes a drum 133 which is fast to a sleeve 134. A clutch spring 136 is wound around the drum and held in place by a clutch sleeve 137. One end of the clutch spring is free, while the other end is attached to a clutch plate 138. Clutch plate 138 in turn is connected to spur gear 139 by a pin 141. Gear 139 is mounted on a shaft 142 which is slideably mounted inside sleeve 134. Shaft 142 and its gear 139 are slidable axially of the shaft from the position shown in full lines in Fig. 18 where gear 139 meshes with a pinion 143 to a position shown in dot-dash lines at 139a in which it meshes with a pinion 144. A spring detent 145 holds the shaft 142 in either position.

Pinions 143 and 144 are driven by a spur gear 146, as shown in Fig. 19. Spur gear 146 is connected to a train of gears (not shown) in the clockwork housed inside casing 97. The clockwork is driven by a main spring 147 (Fig 4). As will be understood, the clockwork may be of conventional form. Clutch spring 136 is released from engagement with drum 133 when the drum is turned in one direction but engages the drum when turned in the opposite direction. Drum 133 in turn is attached to sleeve 134, to which gear 96 is also attached. As already pointed out gear 96 meshes with segment 95 to connect the clockwork to the index hands of the parking meter.

The clutch 98, being a one-way clutch, is disengaged when the index hands and ratchet are advanced in a clockwise direction as shown in Figs. 2 and 16. However, when the index hands are returned in the opposite direction by spring 99 (Fig. 5) the clutch engages and the index hands are returned at the rate of speed governed by the clockwork.

The rate at which the hands are returned can be adjusted by moving shaft 142 and gear 139

(Fig. 18) from the position shown in full lines to the position shown in dot-dash lines. When the shaft 142 and gear 139 are shifted, the gear ratio between spur gear 146 and gear 139 is changed to alter the rate at which gear 139 and the index hands advance under control of the clockwork. This change can be made from outside the casing of the clockwork and without need for removing any parts of the clockwork.

Changes in the time set up on the index hands for each stroke of the mechanism can be made without dismantling or changing the construction of the parts of the meter. As can be seen in Figs. 3 and 8, the length of track 103 can be adjusted by loosening a screw 148 which secures the track to lever 77. Stop 113 (Fig. 15) also can be adjusted readily by loosening a screw 149 and swinging the stop to a new or adjusted position.

The mechanism of the parking meter will accept one or more pennies or nickels, or both nickels and pennies. It automatically totalizes the amount of parking time paid for by each nickel or penny, and the parking time so purchased is added to any unused parking time shown by the meter at the time the coins are inserted. If overtime parking is registered when a coin or coins are inserted, the meter is automatically cleared of overtime without affecting the time purchased by the inserted coins. All the power required for operating the mechanism is supplied by the force required to insert a coin, and no power is required in this operation from the main spring of the clockwork except for operating the clockwork.

The parking meter illustrated in the drawings and described above is subject to structural modification without departing from the spirit or the scope of the appended claims.

Having described my invention, what I claim as new and desire to secure by Letters Patent is:

1. A parking meter which comprises a clock, an index hand controlled by said clock, a one-way clutch between said clock and said index hand, said index hand having a ratchet, a pawl arm, a pawl on said pawl arm engageable with said ratchet when the pawl arm is swung in a direction to advance the ratchet in clutch released direction, a drive spring for swinging the pawl and pawl arm in said direction, a coin slot, a coin operated gate normally closing said slot, a housing attached to said drive spring and advanceable by said gate in a direction to stress said drive spring when a coin is inserted through the slot to swing the gate away from the slot, a drive pawl arm connected to said housing, a drive pawl carried thereby, a drive pin connected to the first mentioned pawl arm and engageable by the drive pawl to connect the drive spring to the first mentioned pawl arm in driving relation, the spring being adapted to swing the first mentioned pawl arm in said direction when the drive spring is stressed, a governor restraining advance of the first mentioned pawl arm, a lock for said governor, a coin passageway receiving coins from said slot, a trigger in said passageway connected to the governor lock and adapted to release the governor lock when engaged by a coin in the passageway, means for releasing the connection between the drive pawl and the first mentioned pawl arm when the first mentioned pawl arm is advanced a predetermined distance from normal position, whereby the first mentioned pawl engages and advances the index hand a predetermined distance in clutch released direction, and means for urging the index hand in clutch engaged direction, the clock restraining advance of the index hand in clutch engaged direction.

2. A parking meter in accordance with claim 1 characterized by the fact that the gate is supported by a gate carrying crank, that the gate carrying crank includes a locking portion engageable with the trigger, and that the locking portion of the gate crank locks the trigger when the gate is open, whereby release of the governor is prevented when the gate is open.

3. A parking meter in accordance with claim 1 characterized by the fact that the gate is supported by a gate carrying crank, that the gate carrying crank and trigger include interlocking portions, and that the interlocking portions of the gate carrying crank and trigger lock the trigger when the gate is open and lock the gate when the trigger is in governor released position, whereby release of the governor is prevented when the gate is open and the gate is locked shut when the governor is released to prevent insertion of a coin when the governor is released.

4. A parking meter in accordance with claim 1 characterized by the fact that the coin slot and the coin passageway are adapted to receive coins of two sizes, that the first mentioned pawl is provided with a pin for lifting it from the ratchet, that a track is provided which is movable from a pawl pin engaging position to a released position, that the track is connected to the trigger, and that the trigger is adapted to hold the track in one of said positions when engaged by a large coin in said passageway and in the other position when engaged by a small coin, said track terminating short of the position at which the first mentioned pawl is disposed when the drive pawl is released, whereby the first mentioned pawl and ratchet are engaged for a greater portion of the stroke of the first mentioned pawl arm when a coin is in the passageway which is of a size to dispose the trigger in track release position than when the coin is of the other size.

5. A parking meter in accordance with claim 1 characterized by the fact that the coin slot, the coin and passageway are adapted to receive coins of two sizes, that the first mentioned pawl is provided with a pin for lifting it off the ratchet, that a track is provided which is movable from a pawl pin engaging position to a released position, that a spring urges the track toward pawl pin engaging position, that a pivotally mounted trigger carrier is connected to said track, that the trigger is pivotally connected to said trigger carrier, that means is provided on the gate framework engageable with the trigger carrier for swinging said trigger carrier in a direction to move the trigger away from the passageway and to move the track to released position when the gate is opened, the last mentioned spring urging the track and trigger carrier in the opposite direction, the trigger being adapted to hold the track in pawl pin disengaged position when engaged by a large coin, the last mentioned spring holding the track in pawl pin engaging position when a small coin engages the trigger.

6. A parking meter in accordance with claim 1 characterized by the fact that a stop is provided limiting the advance of the index hand in clutch engaged direction, and that lugs are provided on the first mentioned pawl arm and ratchet engageable when the index hand is withdrawn in a predetermined overtime distance of said stop to advance the index hand a predetermined overtime distance in clutch released direction in addition to the predetermined distance the pawl advances the ratchet when a coin is inserted.

7. A parking meter in accordance with claim 1 characterized by the fact that the gate is supported by a gate carrying frame, that the gate carrying frame includes a locking portion engageable with the trigger, and that the locking portion of the gate frame locks the gate closed when the trigger is in governor released position to prevent insertion of a coin when the governor is released.

8. A parking meter in accordance with claim 1 characterized by the fact that the first mentioned pawl is provided with a lug for lifting it from the ratchet, that a ratchet release lever is rotatably mounted on the axis of the first mentioned pawl arm, said lever having an arm engageable with said lug, that resilient means urges said lever to engagement with the lug to normally hold said first mentioned pawl off the ratchet, and that a stop is engageable by said release lever when said first mentioned pawl arm is a predetermined distance from its normal position to release the first mentioned pawl into engagement with the ratchet.

9. A parking meter in accordance with claim 1 characterized by the fact that the first mentioned pawl is provided with a lug for lifting it from the ratchet, that a ratchet release lever is rotatably mounted on the axis of the first mentioned pawl arm, said lever having an arm engageable with said lug and a second arm engageable with said ratchet, that resilient means urges said lever into engagement with said lug to normally hold said first mentioned pawl off the ratchet, that a stop is engageable with said the ratchet, that a stop is engageable with said release lever when said first mentioned pawl arm is a predetermined distance from its normal position to release the first mentioned pawl into engagement with the ratchet, and that means is provided for stopping the clock when the ratchet and index hand are at a predetermined position, the second arm of the lever being engageable with the ratchet when the index hand is within a predetermined distance of the clock stopped position.

10. A parking meter in accordance with claim 1 characterized by the fact that the coin slot and the passageway are adapted to receive coins of two sizes, that the first mentioned pawl is provided with a pin and with a lug for lifting it from the ratchet, that a track is provided which is movable from a pawl pin engaging position to a released position, that the track is connected to the trigger, that the trigger is adapted to hold the track in one of said positions when engaged by a large coin in said passageway and in the other of said positions when engaged by a small coin, said track terminating short of the position at which the first mentioned pawl is disposed when the drive pawl is released, that a ratchet release lever is rotatably mounted on the axis of the first mentioned pawl arm, said lever having an arm engageable with said lug, that resilient means urges said lever to engagement with the lug to normally hold said first mentioned pawl off the ratchet, and that a stop is engageable with said release lever when said first mentioned pawl arm is a predetermined distance from its normal position, whereby the first mentioned pawl arm and ratchet are engaged.

11. A parking meter which comprises a clock, an index hand controlled by said clock, a one-way clutch between said clock and said index hand, said index hand having a ratchet, a pawl arm having a pawl engageable with said ratchet when the pawl arm is swung in a direction to advance the ratchet in clutch released direction, means for driving the pawl arm in a direction to advance the ratchet in clutch released direction, a coin slot, a gate normally closing said coin slot, means connected to said gate for cocking the pawl arm driving means when the gate is swung away from the coin slot by a coin inserted therethrough, a governor for controlling the rate of swing of said pawl arm, a lock for said governor, a coin passageway receiving the coin from said slot, a trigger in said passageway connected to the governor lock and adapted to release the governor lock when engaged by a coin in the passageway, whereby the pawl arm and pawl are released when the coin engages the trigger to advance the ratchet and index hand in clutch released direction, and means for urging the index hand in clutch engaged direction, the clock controlling advance of the index hand in clutch engaged direction.

12. A parking meter in accordance with claim 11, characterized by the fact that the trigger is provided with a locking member with which the gate is engageable when displaced from slot closing position, and that the trigger locking member is adapted to prevent actuation of the trigger in governor-releasing direction when the trigger-locking member is engaged by the gate.

13. A parking meter in accordance with claim 11, characterized by the fact that the trigger is mounted on a movable trigger carrier, that the gate is engageable with said trigger carrier when displaced to swing the trigger out of the passageway, that a coin stop is provided in said passageway to hold the coin in position to be engaged by the trigger, and that means are provided for returning the trigger carrier to a position where the trigger engages the coin and releases the governor.

References Cited in the file of this patent

UNITED STATES PATENTS

| Number | Name | Date |
|---|---|---|
| 2,161,046 | Hitzeman | June 6, 1939 |
| 2,168,302 | McGay | Aug. 1, 1939 |
| 2,371,114 | Von Stoeser | Mar. 6, 1945 |
| 2,465,146 | Broussard | Mar. 22, 1949 |